US005157391A

United States Patent [19]

Weitzen

[11] Patent Number: 5,157,391

[45] Date of Patent: Oct. 20, 1992

[54] APPARATUS AND METHOD FOR DISPLAYING A PLURALITY OF FUNCTION INDICATORS IN A SELECTIVE CALL RECEIVER

[75] Inventor: Randi F. Weitzen, Boynton Beach, Fla.

[73] Assignee: Motorola, Inc., Schaumburg, Ill.

[21] Appl. No.: 402,740

[22] Filed: Sep. 5, 1989

[51] Int. Cl.[5] .................... H04Q 7/00

[52] U.S. Cl. .................... 340/825.44; 340/311.1

[58] Field of Search .................... 340/311.1, 709, 710, 340/711, 765, 815.06, 825.44, 825.31, 825.46, 825.47, 825.48; 341/20, 22; 358/194.1; 368/69, 70, 224; 364/709.12, 709.13, 709.14, 709.15, 709.16; 370/93

[56] References Cited

U.S. PATENT DOCUMENTS

| | | | |
|---|---|---|---|
| 4,354,260 | 10/1982 | Planzo | 364/709.15 |
| 4,419,668 | 6/1983 | Davis et al. | 340/825.44 |
| 4,549,279 | 10/1985 | Lapeyre | 364/709.15 |
| 4,713,808 | 12/1987 | Gaskill et al. | 370/93 |
| 4,766,746 | 8/1988 | Henderson et al. | 340/825.31 |
| 4,829,466 | 5/1989 | Davis et al. | 364/900 |
| 4,857,898 | 8/1989 | Smith | 341/22 |
| 4,864,592 | 9/1989 | Lee | 364/709.12 |

OTHER PUBLICATIONS

Motorola "PMR200", 1986, pp. 2–5 (anonymous author(s).

*Primary Examiner*—Donald J. Yusko
*Assistant Examiner*—Dervis Magistre
*Attorney, Agent, or Firm*—Gregg E. Rasor; Vincent B. Ingrassia; William E. Koch

[57] ABSTRACT

In a selective call receiver, an apparatus and method are provided for accessing one or more operational functions via a plurality of displayed function indicators. The function indicators are categorized in sets with a first set representing a selective call receiver status mode that allows alteration of operating characteristics associated with a selective call receiver, and a second set representing a message read mode for controlling the disposition of received messages.

9 Claims, 3 Drawing Sheets

APPARATUS AND METHOD FOR DISPLAYING A PLURALITY OF FUNCTION INDICATORS IN A SELECTIVE CALL RECEIVER

FIELD OF THE INVENTION

This invention relates in general to selective call receivers and more particularly to the menu driven alteration of configuration parameters and information stored within a selective call receiver.

BACKGROUND OF THE INVENTION

Selective call receivers for displaying or presenting information are well known. As technology advances, the marketplace dictates that more features are to be offered on a selective call receiver. In order to access these features, manufacturers have included an array of switches used singularly or in combination to access a specific feature. To achieve user friendly operation of a selective call receiver, the keystroke operation sequence to access a feature must be kept to a minimum. Because of size constraints, the number of switches on a typical selective call receiver is limited to four. Using four switches as an example, the current technology using single keystroke commands can execute four functions directly from the front panel. If one of the switches is designated as a shift operator, the other three can be multiplexed into addressing six functions from the front panel. More functions can be multiplexed on a doubly or triply shifted level but this presents the need for the casual user who has not memorized the operating sequence to refer to an operating manual. Thus, what is needed is a method utilizing a menu driven interface which provides function access using a minimal number of keystrokes.

SUMMARY OF THE INVENTION

Accordingly, it is an object of the present invention to provide an improved method of accessing one or more functions using a menu driven interface to provide for the alteration of configuration parameters and information stored within a selective call receiver.

In carrying out the above and other objects of the invention in one form, there is provided a method for presenting function indicators on a selective call receiver capable of receiving a message, displaying in a first mode a first set of function indicators associated with the first mode and a message, and displaying in a second mode a second set of function indicators associated with the second mode.

BRIEF DESCRIPTION OF THE INVENTION

DETAILED DESCRIPTION OF THE INVENTION

Figure 1:
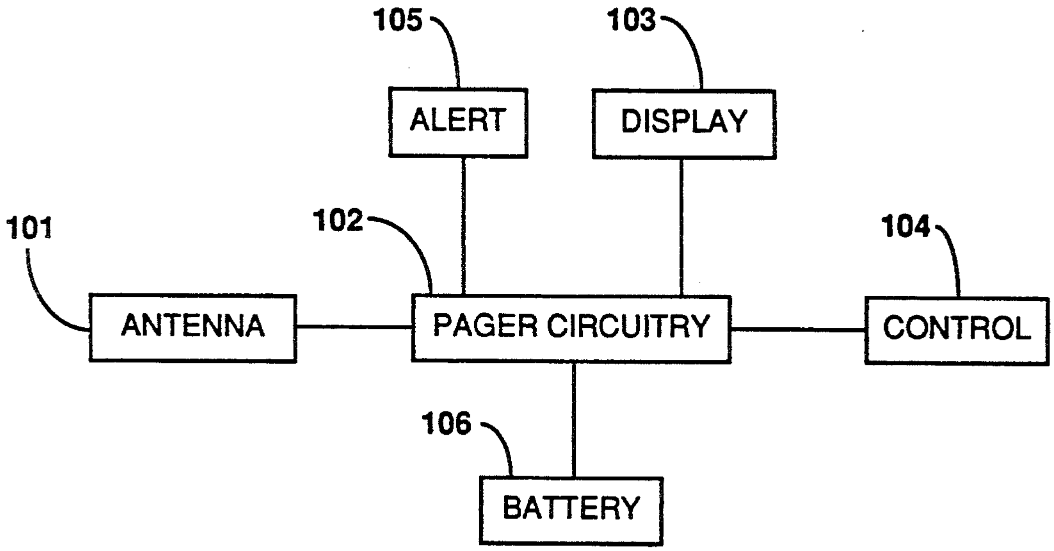
FIG. 1 Prior Art
FIG. 1 is a block diagram of a prior art selective call receiver system.

Referring to FIG. 1, pager circuitry 102 provides an alert 105 and a message on the display 103 in response to an RF signal received by the antenna 101. The user selects one or more functions by activating controls 104. The selective call receiver shown in FIG. 1 is well known to those skilled in the art.

Figure 2:
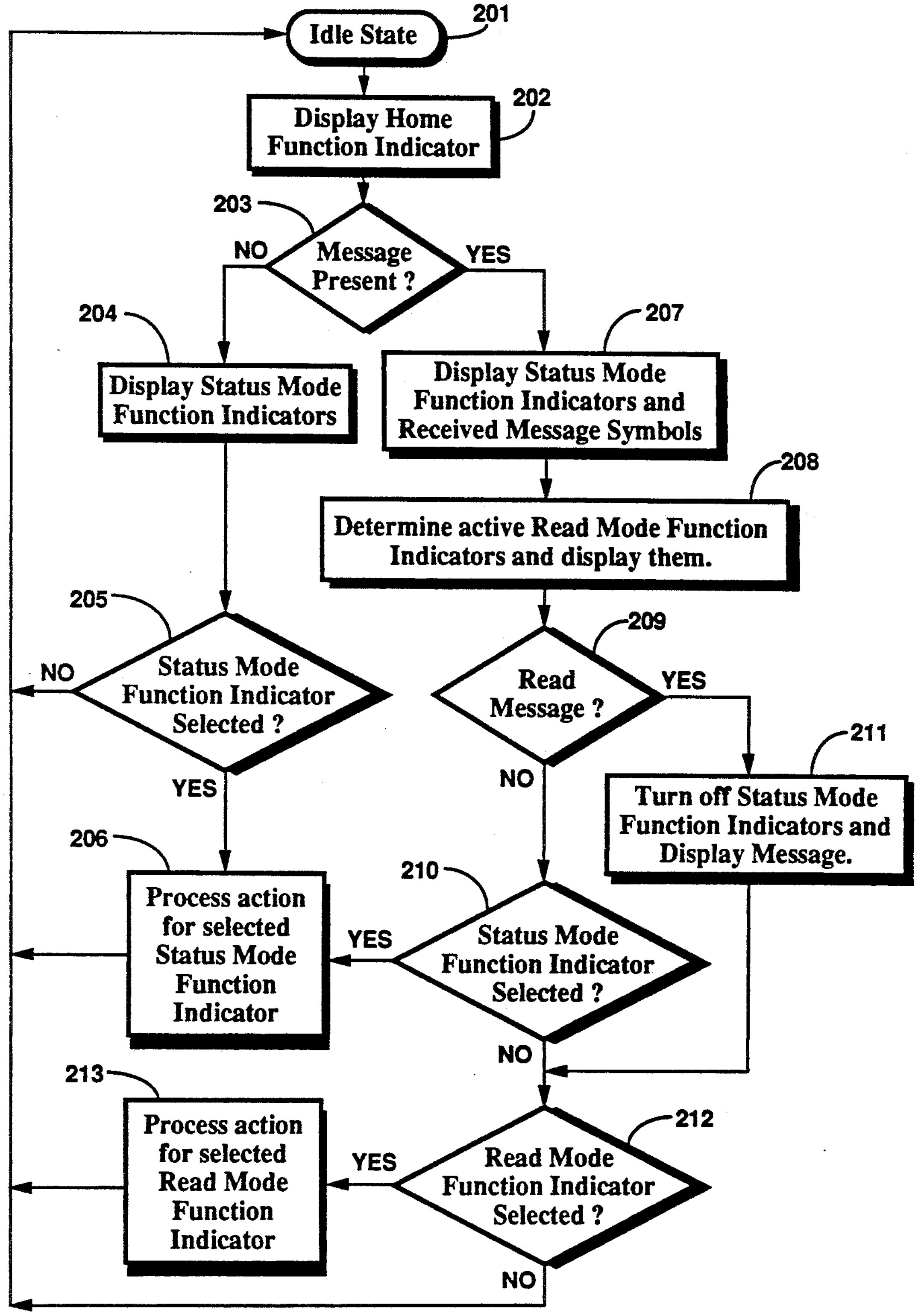
FIG. 2 is a flow chart of the decision tree used in accordance with a preferred embodiment.

Referring to FIG. 2, the flow chart shows a decision tree which controls the display of function indicators that represent specific function actions. In the standby mode, the controller waits in an idle state 201. When the user invokes the function menu, the home function indicator is displayed 202 and the controller checks for the presence of at least one message 203. If no messages are present, the selective call receiver displays status mode function indicators 204. The controller then checks for the selection of a status mode function indicator 205. When a status mode function indicator has been selected, the controller processes the action associated with the selected status mode function indicator 206. In all cases, when the selected action has been completed or the user chooses to escape from the sequence, control is returned to the idle state 201.

If the controller is in the idle state 201 and at least one message has been received by the selective call receiver, when the user invokes the function menu, the home function indicator is displayed 202 and the message present test 203 is true. The controller displays the status mode function indicators and received message symbols 207, then determines which read mode function indicators are active by examining information associated with the selected message to uniquely associate specific read mode function indicators with the selected message and display these function indicators 208. If the user chooses to read the message 209, the status mode indicators are turned off and the message is displayed 211. The user may then select an active read mode indicator 212 and process the action associated with the selected mode indicator 213. If the user does not choose to read the selected message 209, the options are to select either a status mode indicator 210 and its associated action 206 or a read mode indicator 212 and its associated action 213. In all cases, when the selected action has been completed or the user chooses to escape from the sequence, control is returned to the idle state 201.

Figure 3:
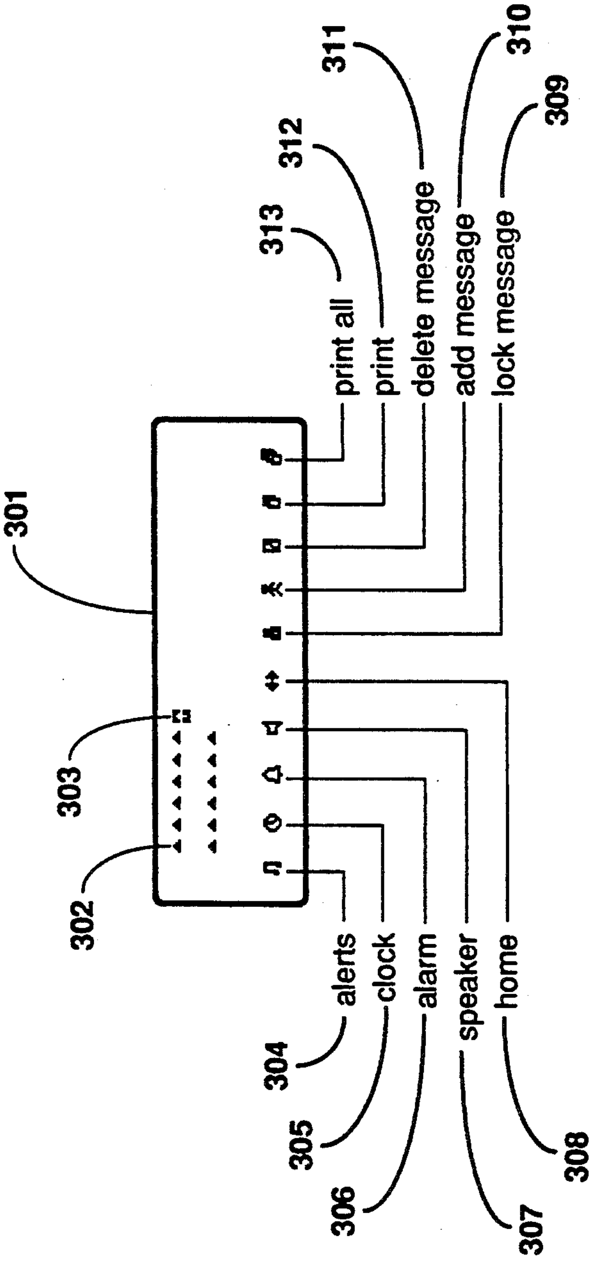
FIG. 3 is a drawing of the display screen used in accordance with the preferred embodiment.

Referring to FIG. 3, the preferred embodiment of a display screen layout 301 is shown. The filled triangles are received message symbols 302 which represent message slots (information storage "bins") that contain information received by the selective call receiver. The inverse highlighted filled triangle 303 represents the position of the active message pointer.

The function indicators 304, 305, 306, 307, 308, 309, 310, 311, 312, 313, are arranged in a menu format below the message slot display lines. These function indicators represent actions which can be performed on information within the selective call receiver. The indicators are grouped by function into read and status modes. The read mode function indicators 308, 309, 310, 311, 312, 313 are used to control the disposition of messages received by the selective call receiver. In this embodiment, read mode function indicators include message locking 309, message addition 310, message deletion 311, print message 312, and print all messages 313. The status mode function indicators 304, 305, 306, 307, 308, are used to access and alter operational parameters associated with intrinsic functions within the selective call receiver. In this embodiment, status mode function indicators include alert selection 304, clock configuration 305, alarm configuration 306, and speaker control 307. The home function indicator 308 is shared by both the read and status modes.

I claim:

1. A method of presenting a plurality of function indicators in a selective call receiver capable of receiving a message, the method comprising the steps of:

in a message read mode:

displaying a first set of said plurality of function indicators associated with said message read mode and said message; and in a selective call receiver status mode:

displaying a second set of said plurality of function indicators associated with said selective call receiver status mode.

2. A method for displaying a plurality of function indicators on a display of a selective call receiver capable of receiving and presenting a message, said method comprising the steps of:

in a message read mode:

determining at least one active indicator from a first set of said plurality of function indicators by examining characteristics associated with said message;

displaying said at least one active indicator; and in selective call receiver status mode:

displaying a second set of said plurality o function indicators associated with the characteristics of said selective call receiver.

3. The method according to claim 2 wherein said determining step comprises the step of comparing information associated with each of said messages to uniquely associate specific operations and their corresponding function indicators within said first set of said plurality of function indicators with each of said messages.

4. The method according to claim 3 wherein said selective call receiver includes an information storage medium and said method executes at least one of the steps of:

reading at least one received message by presenting the received message on the display;

printing at least one received message;

deleting at least one received message from the information storage medium;

adding at least one received message to a different message slot within the information storage medium; and locking at least one received message to prevent deletion from the information storage medium.

5. An apparatus for presenting a plurality of function indicators in a selective call receiver capable of receiving a message, comprising:

in a message read mode:

first means for displaying a first set of said plurality of function indicators associated with said message read mode and said message; and in a selective call receiver status mode:

second means for displaying a second set of said plurality of function indicators associated with said selective call receiver status mode.

6. An apparatus for displaying a plurality of function indicators on a display of a selective call receive capable of receiving and presenting a message, said apparatus comprising:

in a message read mode of operation:

first means for determining at least one active indicator from a first set of said plurality of function indicators by examining characteristics associated with said message;

second means for displaying said at least one active indicator; and in a selective call receiver status mode of operation:

third means for displaying a second set of said plurality of function indicators associated with the characteristics of said selective call receiver.

7. The apparatus according to claim 6 wherein said first means comprises comparing information associated with each of said messages to uniquely associate specific operations and their corresponding function indicators within said first set of said plurality of function indicators with each of said messages.

8. An apparatus for displaying a function menu including a plurality of function indicators on a display of a selective call receiver of the type which receives messages and presents messages, said method comprising:

means for displaying only those of said function indicators which may be selected; and means for performing an operation associated with one of said plurality of function indicators when said function indicator is selected.

9. The apparatus according to claim 8 wherein said selective call receiver includes an information storage medium and wherein said means for performing comprises means for reading, writing, deleting, and moving information within said information storage medium.

* * * * *

US005157391C1

(12) EX PARTE REEXAMINATION CERTIFICATE (8172nd)

United States Patent

Weitzen

(10) Number: US 5,157,391 C1

(45) Certificate Issued: Apr. 26, 2011

(54) APPARATUS AND METHOD FOR DISPLAYING A PLURALITY OF FUNCTION INDICATORS IN A SELECTIVE CALL RECEIVER

(75) Inventor: Randi F. Weitzen, Boynton Beach, FL (US)

(73) Assignee: Motorola, Inc., Schaumburg, IL (US)

Reexamination Request:
No. 90/010,279, Sep. 16, 2008
No. 90/009,509, Jul. 1, 2009

Reexamination Certificate for:
Patent No.: 5,157,391
Issued: Oct. 20, 1992
Appl. No.: 07/402,740
Filed: Sep. 5, 1989

(51) Int. Cl.
*G08B 3/10* (2006.01)
*G08B 3/00* (2006.01)
*G08B 5/22* (2006.01)

(52) U.S. Cl. ...................................... 340/7.56; 340/7.52

(58) Field of Classification Search ........................ None
See application file for complete search history.

(56) References Cited

U.S. PATENT DOCUMENTS 4,249,165 A 2/1981 Mori
4,291,198 A 9/1981 Anderson et al.
4,313,108 A 1/1982 Yoshida
4,425,627 A 1/1984 Eibner
4,437,095 A 3/1984 Akahori et al.
4,634,845 A 1/1987 Hale et al.
4,653,086 A 3/1987 Laube
4,786,902 A 11/1988 Davis et al.
4,975,896 A 12/1990 D'Agosto, III et al.

FOREIGN PATENT DOCUMENTS

JP S63-177255 7/1988
JP 01077255 A 3/1989

OTHER PUBLICATIONS

Motorola, Inc. v. Vtech Communications, Inc., et al, United States District Court for the Eastern District of Texas, Civil Action No. 5:07–CV–171, "Claim Construction Order Construing U.S. Patent Nos. 5,157,391; 5,394,140; 5,848,356; 4,866,766; 7,070,349; and U.S. Design Patent No. D559, 842", filed Jul. 6, 2009, pp. 1–99.

*Primary Examiner*—Lynne H. Browne

(57) ABSTRACT

In a selective call receiver, an apparatus and method are provided for accessing one or more operational functions via a plurality of displayed function indicators. The function indicators are categorized in sets with a first set representing a selective call receiver status mode that allows alteration of operating characteristics associated with a selective call receiver, and a second set representing a message read mode for controlling the disposition of received messages.

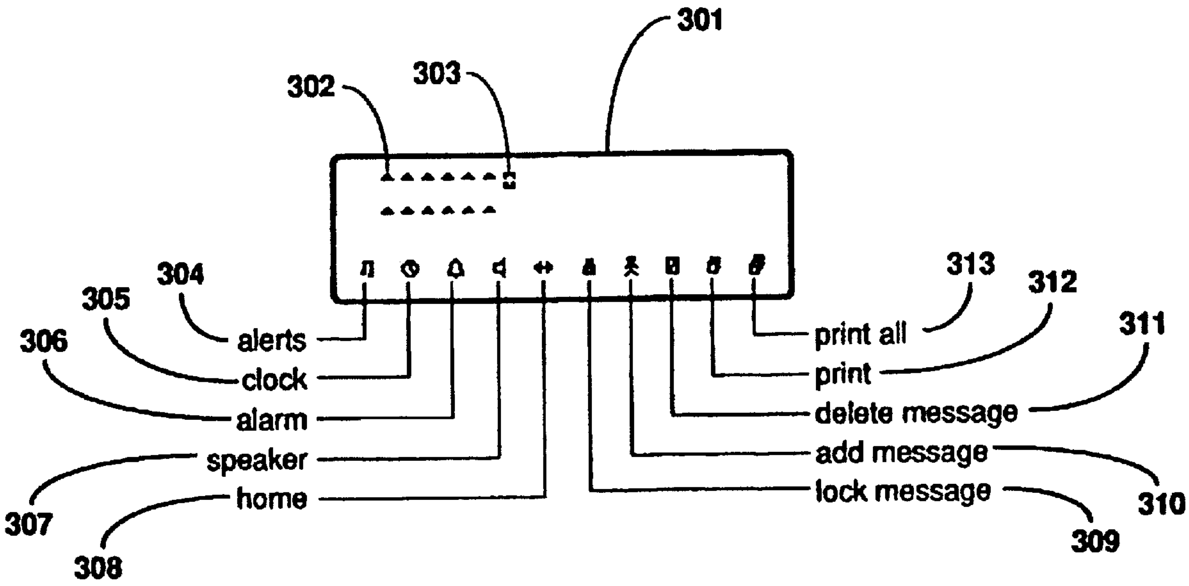

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1, 2, 5 and 6 is confirmed.

Claims 8 and 9 are cancelled.

Claims 3, 4 and 7 were not reexamined.

* * * * *